United States Patent [19]

Dickey, Jr.

[11] 3,740,655

[45] June 19, 1973

[54] DIGITAL GENERATION OF QUADRATURE SAMPLES

[75] Inventor: Frank R. Dickey, Jr., Dewitt, N.Y.

[73] Assignee: General Electric Company, Syracuse, N.Y.

[22] Filed: Nov. 24, 1971

[21] Appl. No.: 201,689

[52] U.S. Cl. ............... 328/166, 328/109, 328/133, 328/140, 307/233, 307/293

[51] Int. Cl. ............................................ H03k 5/00

[58] Field of Search .................... 328/39, 166, 109, 328/110, 133, 140; 307/233, 225, 207, 293; 324/82–83; 332/16; 340/170; 178/67

[56] References Cited

UNITED STATES PATENTS

| | | | |
|---|---|---|---|
| 2,840,634 | 6/1958 | Bedford | 328/166 |
| 2,888,557 | 5/1959 | Schneider | 307/293 |
| 3,368,036 | 2/1968 | Carter | 178/67 |

*Primary Examiner*—John S. Heyman
*Assistant Examiner*—Ro E. Hart
*Attorney*—Carl W. Baker et al.

[57] ABSTRACT

A method and apparatus for generating digitized quadrature samples which approximate the sampled complex envelope of an input waveform by digitally sampling the input signal and applying the resultant digital samples to a digital processing system to obtain pairs of quadrature samples of the input signal. The input digital samples are digitally combined, delayed, and multiplied by the digital processor to form the quadrature samples. An alternative method and apparatus takes digital samples from a plurality of input signals, applies the digital samples to an alternative form of digital processor, and generates multiplexed quadrature samples of the input signal.

7 Claims, 5 Drawing Figures

FILTER RESPONSE TO SINE WAVE

DIGITAL GENERATION OF QUADRATURE SAMPLES

BACKGROUND OF THE INVENTION

FIELD OF THE INVENTION

Digital signal processing has recently come into increasingly wider use in radar, sonar and communications equipments for performance of a variety of tasks such as beamforming and beamsteering for transmitting and receiving arrays, and the extraction and identification of useful information immersed in clutter or other noise in received signal waveforms. Frequently in such systems it is necessary to process a large number of signals simultaneously through a large number of operations or channels, as for example in sonar systems in which the received signals may be processed through a number of doppler filter banks providing a plurality of signal outputs corresponding to the number of doppler filters in each such bank. In array systems, as another example, beamforming and steering signals normally are processed individually for each element of the array, and individually for each beam to be formed and steered by the array, so again the number of signals requiring processing may become extremely large.

To simplify digital signal processing in such systems, it is common practice to reduce to lower frequency the spectral components of each signal waveform to be processed, to thus reduce the volume of data requiring processing and the data rate at which it must be accommodated. One known technique for accomplishing such reduction is to derive from each input signal a pair of quadrature component signals which together define a single complex waveform corresponding to the complex envelope of that signal. Thus the pair of quadrature component signals contain the same useful information as does the input signal, but consist of spectral components of lower frequency and so may be processed at lower data rate and by processors of relatively smaller capacity.

The complex envelope R(t) of a real input signal S(t) having a center or carrier frequency $f_c$ is a signal whose complex spectrum (Fourier transform) has a positive frequency portion of twice the amplitude of the positive frequency portion of the complex spectrum of S(t) and is moved to the left on the frequency axis by an amount $f_c$. The complex envelop R(t) is defined in terms of input signal S(t) and the Hilbert transform of S(t) which transform generates a waveform designated as $\hat{s}(t)$. This waveform $\hat{s}(t)$ is such as to cancel the negative frequency portion and double the amplitude of the positive frequency portion of the spectrum of the signal S(t) of which it is a transform. The complex envelope R(t) of signal S(t) therefore may be written as:

$$R(t) = [S(t) + j\,\hat{S}(t)]\, e^{-J\,-\pi f_o t} \quad (1)$$

By using Euler's identity $e^{-jx}$=cox $x$ − jsin $x$, and rearranging terms, equation (1) may be rewritten:

$$R(t) = [S(t)\cos 2\pi f_c t + \hat{S}(t)\sin 2\pi f_c t] + j\,[\hat{s}(t)\cos 2\pi f_c t - S(t)\sin 2\pi f_c t] \quad (2)$$

The complex envelope $R(t)$ may therefore be expressed in terms of a real part $I(t)$ and an imaginary part $Q(t)$:

$$R(t) = I(t) + j\,Q(t) \quad (3)$$

where:

$$I(t) = S(t)\cos 2\pi f_c t + \hat{s}(t)\sin 2\pi f_c t \quad (4)$$

$$Q(t) = \hat{s}(t)\cos 2\pi f_c t - S(t)\sin 2\pi f_c t \quad (5)$$

By multiplying equation (4) by $\cos 2\pi f_c t$ and equation (5) by $\sin 2\pi f_c t$ the input signal $S(t)$ may be expressed as:

$$S(t) = I(t)\cos 2\pi f_c t - Q(t)\sin 2\pi f_c t \quad (6)$$

$I(t)$ and $Q(t)$ are called the quadrature components of the real signal waveform $S(t)$ at the carrier frequency $f_c$. The present invention is directed toward improved methods and apparatus for generating digital samples representing these quadratue components $I(t)$ and $Q(t)$, in real time and with relatively simple and economical implementation.

DESCRIPTION OF THE PRIOR ART

Prior art methods of generating quadrature component signals employ demodulators which mix a standard frequency signal with a real input signal $S(t)$ to obtain quadrature components $I(t)$ and $Q(t)$ of the input signal. For example, one such prior art system employs a 90° phase shift network to generate approximately a Hilbert transform signal $\hat{s}(t)$ from a real input signal $S(t)$. The signal $S(t)$ is mixed with a signal, $\cos 2\pi f_c t$ and a signal, $-\sin 2\pi f_c t$, by first and second demodulators respectively. Hilbert transform signal $\hat{s}(t)$ is mixed with a signal, $\sin 2\pi f_c t$ and a signal, $\cos 2\pi f_c t$, by third and fourth demodulators respectively. The output from the first demodulator is added to the output from the third demodulator to provide a quadrature component signal $I(t)$ equal to $S(t)\cos 2\pi f_c t + \hat{s}(t)\sin 2\pi f_c t$. The output from the second demodulator is added to the output from the fourth demodulator to provide a quadrature component signal $Q(t)$ equal to $$\hat{s}(t)\cos 2\pi f_c t - S(t)\sin 2\pi f_c t.$$

In another prior art system, a first demodulator multiplies the input signal $S(t)$ by a signal $2\cos 2\pi f_c t$ and a second demodulator multiplies the input signal $S(t)$ by a signal $-2\sin 2\pi f_c t$. When the input signal $S(t)$ is expressed in terms of equation (6), the output from the first demodulator may be expressed as:

$$I(t) + I(t)\cos 4\pi f_c t - Q(t)\sin 4\pi f_c t \quad (7)$$

and the output from the second demodulator is represented as:

$$Q(t) - Q(t)\cos 4\pi f_c t - I(t)\sin 4\pi f_c t \quad (8)$$

The last two terms in both expression (7) and expression (8) represent sine waves at a frequency of 2 times the frequency ($2\pi f_c t$), amplitude modulated by low frequency waveforms. These terms may be removed by low pass filters, leaving the quadrature component signals $I(t)$ and $Q(t)$.

Prior art systems such as those described above which employ demodulators tend to be undesirably complex and correspondingly costly particularly in cases where a large number of signal channels are to be time multiplexed and digitized.

SUMMARY OF THE INVENTION

One embodiment of the present invention comprises a method and apparatus for first digitally sampling a real input signal at first selected time intervals and second, delaying, multiplying and combining the digital input signal samples in a digital system according to a prescribed pattern to obtain quadrature samples equivalent to those which could have been obtained in the prior art from demodulators operating as just explained. An alternate method and apparatus takes digital samples from a plurality of real input signals, applies the samples to a digital processor system, and generates multiplex quadrature samples of the input signals.

It is therefore an object of the present invention to provide a method and apparatus for generating quadrature samples of a real signal without the use of demodulators.

A further object of the present invention is to provide a method and apparatus for generating multiplexed quadrature samples from a plurality of real input signals.

Further objects and advantages of the invention will be apparent to those skilled in the art from the following description of the invention, taken in conjunction with the attached drawings.

DESCRIPTION OF THE INVENTION

Figures 1, 2:
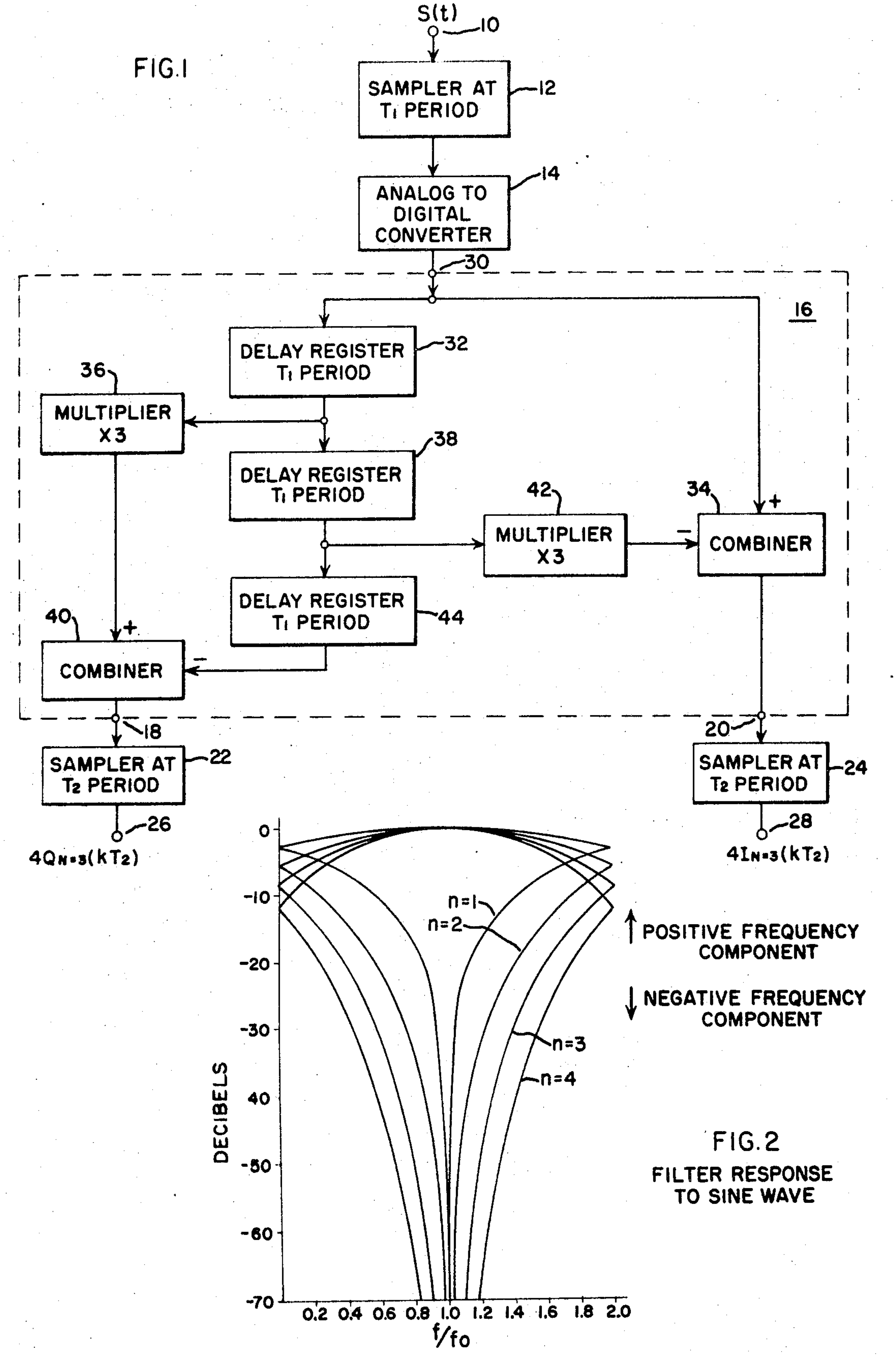
FIG. 1 is a block diagram of one embodiment of the invention.
FIG. 2 is a graph of a filter response to a sine wave.

According to the present invention, as shown in one embodiment in FIG. 1, a real input signal $S(t)$ applied to terminal 10 is sampled at a first selected time interval $T_1$ by sampler 12. The input samples are sent to an analog-to-digital converter 14 wherein the input samples are converted to digital samples. The digital samples, which are hereinafter referred to as digital samples S(t), are communicated to a digital processor system 16 where they are delayed, multiplied and combined in accordance with the concepts of the invention. A first output terminal 18 and a second output terminal 20 of the digital processing system 16 are shown sampled by samplers 22 and 24 respectively at a second selected time interval $T_2$, to generate quadrature samples Q(t) at output terminal 26 of sampler 22 and quadrature samples I(t) at output terminal 28 of sampler 24. However, in some cases, the quadrature samples Q(t) and I(t) may be taken from output terminals 18 and 20 respectively without sampling.

To better understand the particular digital processor 16, it is helpful to review a theoretical analysis of the invention.

ANALYSIS OF THE INVENTION

As mentioned above, the present invention is a method and apparatus for generating digitized quadrature samples I(t) and Q(t) approximating the sampled complex envelope of a real input signal S(t) relative to a center or carrier frequency $f_c$. To explain the mathematical principle used in the invention it is convenient to introduce a function known in the literature as the analytic signal. This function is defined as $\mathcal{S}(t) = [S(t) + \hat{S}(t)]$, and is the waveform whose Fourier spectrum in the positive frequency region is the same as that of $S(t)$ except for a factor of 2, but whose spectrum in the negative frequency region is zero. Using this definition and applying equation (1) at periodic time intervals, $t = kT_2$ where $k$ is an integer and $T_2$ is the time period between quadrature samples, the complex envelope can be expressed as:

$$R(kT_2) = \mathcal{S}(kT_2)\, e^{-j2\pi f_c kT_2} \tag{9}$$

The first step in generating $R(kT_2)$ is to establish a signal equivalent to $\mathcal{S}(kT_2)$. Once $\mathcal{S}(kT_2)$ is obtained, $R(kT_2)$ may be derived by substituting $\mathcal{S}(kT_2)$ into equation (9).

To generate $\mathcal{S}(kT_2)$ consider a class of complex parameter filters which have a gain of two near the positive frequency $f_c$ and which have nearly zero gain near the negative frequency $-f_c$. As is well known in the art, sampled data filters may be described in terms of the location of poles and zeros in the complex frequency or z-plane. Points on the z-plane are defined by:

$$z = \cos(2\pi fT) + j\sin(2\pi fT) = e^{j2\pi fT} \tag{10}$$

where $T$ is the sampling interval and $f$ may be a complex quantity.

From equation 10 it may be seen that for all real values of $f$, $z$ lies on the locus of points defining a unit circle around the origin. Also, for $f = 0$, $z = 1$, and as $f$ increases, $z$ moves counterclockwise around the unit circle. By taking the samples at the interval $T = 1/(4f_c)$, $z$ equals $+j$ on the $z$-plane when $f$ equals $f_c$, and $z$ equals $-j$ on the $z$-plane when $f$ equals $-f_c$. Therefore, $f_c$, the center of the positive frequency portion of the spectrum of $S(t)$, is positioned on the $z$-plane as far away as possible from $-f_c$, the center of the negative frequency portion of the spectrum of $S(t)$.

By providing a complex parameter filter with an n'th order zero at $z$ equals $-j$, the filter will provide complete suppression at $f = -f_c$ and will provide a high degree of suppression over a band of frequencies centered at $f = -f_c$. Assuming such a complex filter has a gain of two and therefore doubles the positive frequency portion of the spectrum of $S(t)$ the filter may be expressed in terms of $z$ as:

$$a(z) = (1 + jz^{-1})^{n/2^{n-1}} \tag{11}$$

In terms of frequency with $T = 1/(4f_c)$ and $z = e^{+j2\pi\, 24fT}$ the filter response is:

$$H(f)=a(e^{+j2\pi ft})=\{1+je^{-j2\pi f[1/(4f_c)]}\}^n/2^{n-1} \quad (12)$$

The amplitude response of the filter is obtained by taking the absolute value which turns out to be:

$$|H(f)| = 2|\sin^n[(\pi/4)(1+f/f_c)]| \quad (13)$$

For any sine wave input, the filter output is a complex waveform consisting of a positive frequency component and a negative frequency component. The amplitude of the negative frequency component will be much smaller than that of the positive frequency component if the frequency is near $f_c$.

The amount of suppression by the filter of the negative frequency portion of a real input signal as a function of frequency is compared in FIG. 2 for a sine wave input signal and several different values of n. The graphs in FIG. 2 are obtained by plotting equation (13) converted to decibels relative to a maximum value and by folding the negative frequency region over into the positive frequency region. The vertical distance between each upper curve (positive frequency component) and the corresponding lower curve (negative frequency component) is the amount of suppression in decibels of the undesired negative frequency component of a sine wave relative to the desired positive frequency component. The graphs in FIG. 2 indicate that suppression of negative frequency components in the range of 40 to 60 dB is obtained over a bandwidth of up to 50 percent of $f_c$. By increasing $n$, the bandwidth can be increased for a given amount of suppression.

The filter output, which is to be treated as $\mathfrak{S}(t)$, is given by:

$$\mathfrak{S}(t) \cong h(t) * S(t) \quad (14)$$

Here $h(t)$ is the Fourier transform of $H(f)$ of equation (13) and is expressed as:

$$h(t)=2^{1-n}\sum_{p=0,1,2\ldots}^{n} A_n(p)\,(j)^p\,\delta(t-pT_1) \quad (15)$$

where:

$\delta(t)$ = the delta or impulse function $A_n(p) = n!/(n-p)!p!$ $T_1$, the time period between samples of $S(t)$, equals $1/(4f_c)$.

$T_2$, the time period between quadrature samples, is the time period when the output of the filter is resampled and it usually is a multiple of $T_1$. That is, $T_2 = mT_1$ where $m$ is an integer. However, $m$ must be chosen such that $1/T_2$ is greater than the bandwidth of $S(t)$.

Now by substituting equation (15) into equation (14) and then substituting the result into equation (9), the following result for the approximate sampled complex envelope is obtained:

$$R(kT_2)\cong(-j)^{mk}2^{1-n}\sum_{p=0,1,2\ldots}^{n}\{A_n(p)(j)^p\}S(kT_2-pT_1) \quad (16)$$

Reviewing FIG. 2 it may be determined, for example, that for a given input signal $S(t)$, a filter with a third order zero at $z=-j$(i.e., $n = 3$) may provide sufficient suppression of the unwanted negative frequency components of $S(t)$. Then for $n = 3$, equation (16) is written:

$$R_{n=3}(kT_2) = (-j)^{mk}\{[1/4S(kT_2) - ¾\,S(kT_2-2T_1)] + j[¾S(kT_2-T_1) - 1/4S(kT_2-3T_1)]\} \quad (17)$$

By choosing $m = 4$ (or any multiple of 4) the multiplier $(-j)^{mk}$ equals 1 amd remembering that $R(t) = I(t) + jQ(t)$ then:

$$4I_{n=3}(kT_2) = S(kT_2) - 3S(kT_2 - 2T_1) \quad (18)$$

and $$4Q_{n=3}(kT_2) = 3S(kT_2 - T_1) - S(kT_2 - 3T_1) \quad (19)$$

Figure 3:
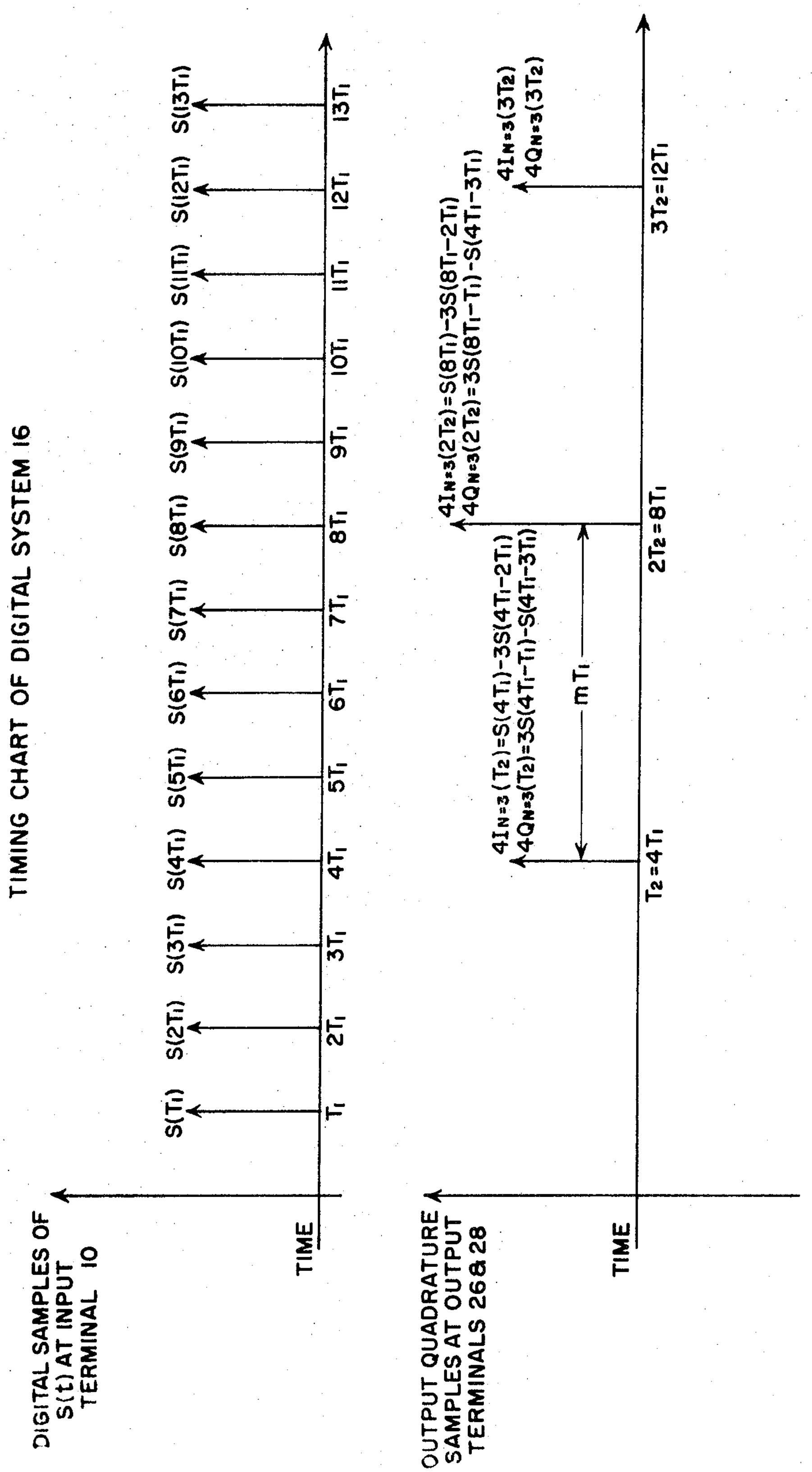
FIG. 3 is a timing chart of the embodiment shown in FIG. 1.

Referring to FIG. 3, one may better understand the relationship between $T_1$, $T_2$, $m$ and $k$. A plurality of digital samples of real input signals $S(t)$ are shown on a time axis. The digital samples are taken at time intervals $T_1$ where the time period $T_1$ equals one quarter the inverse of the carrier frequency $f_c$. $T_2$ is the time interval between the generation of successive quadrature sample pairs $I(t)$ and $Q(t)$ and is equal to $m$ times the length of $T_1$.

For example, when $m = 4$, time $T_2$ is equivalent to $4T_1$ and time $3T_1$ is the equivalent of time $T_2$ minus $T_1$. Also, when m is chosen to be four and $n$ is chosen to be three, then $I(t)$ and $Q(t)$ can be simplified to equations (18) and (19). Therefore, if three times the digital sample S(t) taken at time $t$ equals $2T_1$ were delayed two $T_1$ time periods until $t$ equals $4T_1$ and the delayed sample were subtracted from the digital sample $S(t)$ taken at time $t$ equals $4T_1$, then the resulting signal would be four times $I(t)$ at time $t$ equals $4T_1$. Also, if the digital sample $S(t)$taken at time $t$ equals $T_1$ were delayed three $T_1$ periods until $t$ equals $T_2$ and the delayed signal were subtracted from three times the digital sample $S(t)$ taken at time $t$ equals $3T_1$ and delayed one $T_1$ time period until $t$ equals $T_2$, then the resulting signal would be 4 times $Q(t)$ at time $t$ equals $T_2$.

ONE EMBODIMENT

According to the present invention, a digital processing system may be formed accordingly for any choice of $m$ or $n$. As an illustrative example, the digital processor 16 shown in FIG. 1 comprises the circuitry necessary to provide the required delaying, multiplying and combining of input signals $S(t)$ to generate 4 times the quadrature signals $I(t)$ and $Q(t)$ as determined by equation (16) when $m$ is chosen equal to four and $n$ is chosen equal to three and equation (16) can therefore be simplified to equations (18) and (19).

The digital system 16 has an input terminal 30 which is adapted to receive digital signals from analog-to-digital converter 14. The input terminal 30 is connected to an input of delay register 32 and input terminal 30 is also connected to a positive input of combiner 34. The output of delay register 32 is connected to an input of multiplier 36 and the output of delay register 32 is also connected to an input of delay register 38. The output from multiplier 36 is connected to a positive input of combiner 40. The output from delay register 38 is connected to the input of a multiplier 42 and is also connected to the input of a delay register 44. The output from delay register 44 is connected to a negative input of combiner 40. The output of combiner 40 is communicated to first output terminal 18 of digital system 16. The output from multiplier 42 is connected to a negative input of combiner 34. The output from combiner 34 is communicated to second output terminal 20 of digital system 16.

In operation, the real input signal S(t) is applied to input terminal 10 of FIG. 1. Sampler 12 operates at the time period $T_1$ to sample input signal $S(t)$. As discussed above, time period $T_1$ equals $1/(4f_c)$ and time period $T_2$ equals $mT_1$. In this particular embodiment, $m$ is chosen to be four. The analog samples of real input signal S(t) are converted from analog samples to digital samples by analog-to-digital converter 14. The digital sample signals of S(t) are transmitted from the output of analog-to-digital converter 14 to input terminal 30 of the digital system 16. In the digital system 16, the digital samples S(t) follow two partially common channels: the first comprising delay registers 32, 38 and 44, multiplier 36, and combiner 40, and the second comprising delay registers 32 and 38, multiplier 42 and combiner 34.

In the first path, the digital samples S(t) are communicated to delay register 32 where they are delayed for a time period $T_1$. The output signal from delay register 32 is communicated to delay register 38 where it is delayed a second time period $T_1$. The output signal from delay register 38 is communicated to the delay register 44 where it is delayed another time period $T_1$. The output of delay register 44, which has been delayed three time periods $T_1$, is applied to a negative input of combiner 40. The output from delay register 32 is also applied to the input of multiplier 36 where the amplitude of the output signal is multiplied by a factor of three. The output from multiplier 36 is applied to a positive input of combiner 40. The output from combiner 40 appears at first output terminal 18 and is sampled by sampler 22 at a time period $T_2$. Therefore, at a time $t$ equals $T_2$ which is equivalent to $4T_1$, the digital signal appearing at output terminal 26 of sampler 22 comprises three times the digital sample S(t) taken at a time $t$ equals $3T_1$, and delayed by one time period $T_1$, minus digital sample S(t) taken at a time t equals $T_1$ and delayed three time periods $T_1$. As shown by equation (19), this combination of digital samples $3S(3T_1)$ minus $S(T_1)$ is equivalent to the imaginary quadrature sample 4Q(t) at time $t$ equals $T_2$ when $n$ is chosen equal to three.

In the second signal path, the digital samples S(t) appearing at input terminal 30 also pass through delay registers 32 and 38 to be delayed a total of two time periods $T_1$. The output from delay register 38 is applied to the input of multiplier 42 where it is multiplied by a factor of three. The output of multiplier 42 is communicated to the negative input of combiner 34. The digital sample S(t) appearing at input terminal 30 is also applied directly to a positive input terminal of combiner 34. The output of combiner 34 appears at second output terminal 20 and is sampled by sampler 24 at a time period $T_2$. Therefore, at a time $t$ equals $T_2$, the digital signal appearing at output terminal 28 of sampler 24 comprises the digital sample S(t) taken at a time $t$ equals $4T_1$ or $T_2$, minus 3 times the digital sample S(t) taken at a time $t$ equals $2T_1$ and delayed by two time periods $T_1$ until $t$ equals $T_2$. As shown by equation (18), this combination of digital samples $S(4T_1)$ minus $3S(2T_1)$ is equivalent to the real quadrature sample I(t) at time $t$ equals $T_2$ when $n$ is chosen equal to three and $m$ is chosen equal to four.

The processing of digital samples S(t) may be repeated as many times as desired to generate additional quadrature samples I(t) and Q(t) at times equal to multiples of time period $T_2$. It should be noted that if, for example, $m$ where chosen to be one then digital system 16 can be designed so that there would be no need for samplers 22 and 24 since the quadrature samples I(t) and Q(t) could be directly taken from output terminals 18 and 20, respectively.

ANOTHER EMBODIMENT OF THE INVENTION

The digital processing system 16 of FIG. 1 is capable of producing output quadrature samples at the input sampling rate $T_1$ whereas a lower output rate is permissible for most applications. That is to say, for most applications m may be greater than one. In addition, in many applications there are a plurality of input channels instead of the single input channel of digital processor 16. The embodiment of the present invention shown in FIG. 4 provides an output rate which is lower than the input sample rate, but efficiently employs the same number of multipliers, delay registers and combiners as in FIG. 1 to handle a plurality of input channels.

Figure 4:
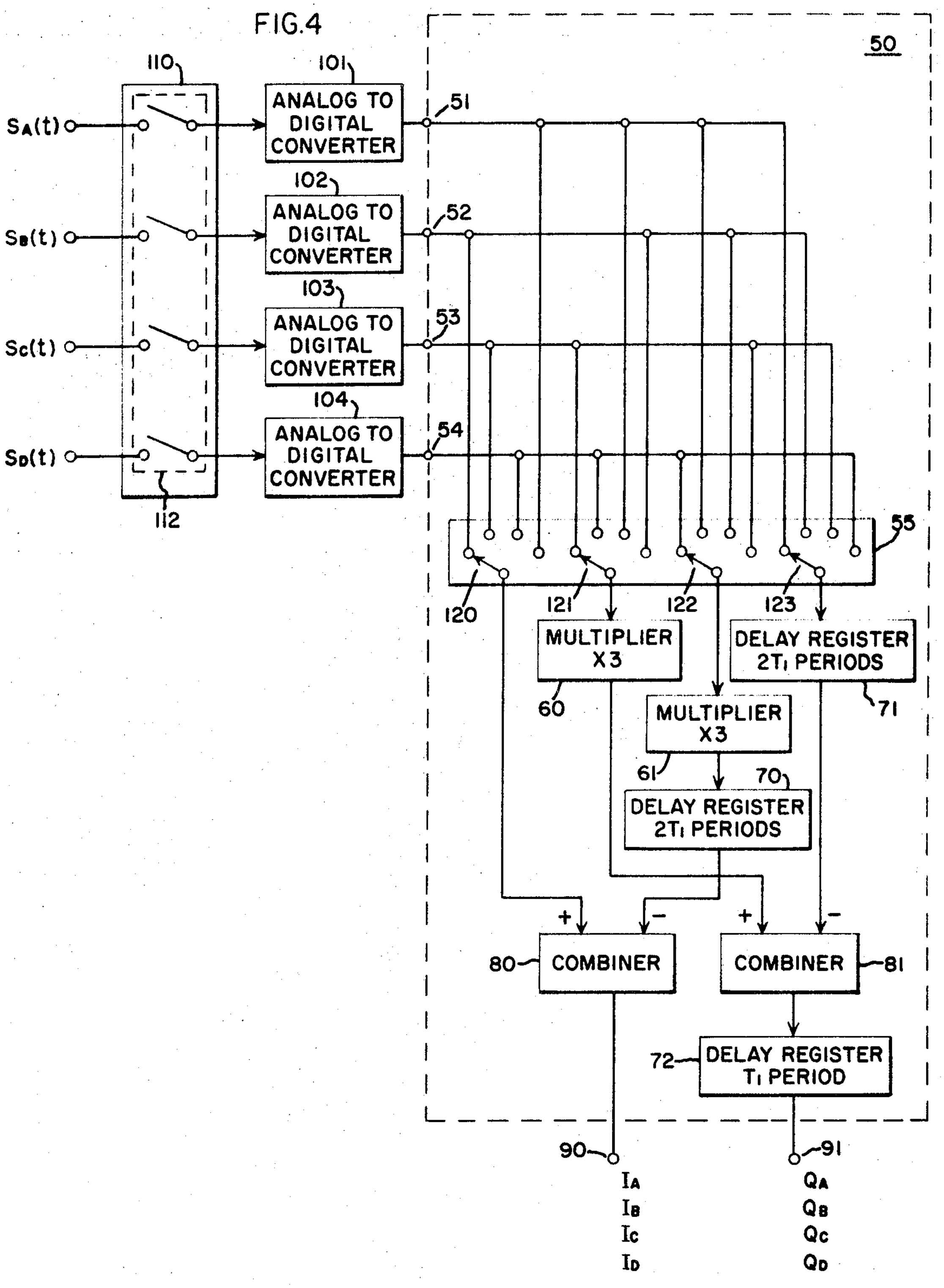
FIG. 4 is a block diagram of another embodiment of the invention.

As is true with respect to FIG. 1, the embodiment shown in FIG. 4 is but one of a multitude of embodiments which are defined by equation (16). In order to simplify the discussion, values for $n$ and $m$ were again chosen to be 3 and 4 respectively, so that equation (16) as applied to this embodiment again reduces to equations (18) and (19).

As a matter of notation the subscript $n = 3$ will be dropped from $I(kT_1)$ and $Q(kT_1)$ in the following, it be understood that in this embodiment $n = 3$. Further, a letter subscript A, B, C, or D will be added to $I(kT_1)$ and $Q(kT_1)$, to indicate a quadrature sample associated with a particular input signal $S_A$, $S_B$, $S_C$ or $S_D$ of the same subscript.

When operating with a plurality of input signals, it is perhaps easier to refer to the time and output quadrature sample occurs ($kT_2$) in terms of the input sampling time period $T_1$. This becomes immediately apparent when reviewing the timing chart of digital system 50 shown in FIG. 5. The operational parameters here are the same as they were in the first described embodiment: $T_1$ is the time period at which samples of the input signals are taken and is equal to $1/(4f_c)$; $T_2$ is the time period between generation of quadrature samples of a particular input signal where $T_2 = mT_1$; and time t is measured in terms of integral steps. However, when $m$ is chosen equal to four and four input signals are sampled, it is no longer convenient to measure time $t$ in terms of steps of time period $T_2$ ($t{=}kT_2$). Instead, since a new set of quadrature samples are generated each time period $T_1$, it is much more convenient to now measure time t in terms of time period $T_1$, $t = pT_1$, where $p$ is an integer.

With respect to input sample $S_A$, equations (18) and (19) may accordingly be rewritten as:

$$4I_A(pT_1) = S_A(pT_1) - 3S_A(pT_1 - 2T_1) \tag{20}$$

and $$4Q_A(pT_1) = 3S_A(pT_1 - T_1) - S_A(pT_1 - 3T_1) \quad (21)$$

Turning now to FIG. 4, digital system 50 has four input terminals 51, 52, 53 and 54; a selector 55; first and second multipliers 60 and 61; first, second, and third delay registers 70, 71, and 72; first and second combiners 80 and 81 and two output terminals 90 and 91. Each of the four input terminals 51, 52, 53 and 54 is connected to the ouput of a respective analog-to-digital converter 101, 102, 103 and 104. The inputs of each of the analog-to-digital converters 101, 102, 103 and 104 are connected to a sampling device 110, which sampling device 110 includes four inputs for receiving four input signals $S_A$, $S_B$, $S_C$ and $S_D$, and further includes a plurality of siwtches 112 to sample each of the input signals at the periodic sampling period of $T_2$. The sampling device 110 therefore operates to simultaneously provide samples of input signals $S_A$, $S_B$, $S_C$ and $S_D$ to respective analog-to-digital converters 101, 102, 103, and 104. The analog-to-digital converters operate to simultaneously provide digital samples of input signals $S_A$, $S_B$, $S_C$ and $S_D$ to respective input terminals 51, 52, 53 and 54 at the input sampling period of $T_1$.

Within digital system 50 the digital samples of signals $S_A$, $S_B$, $S_C$ *and SD* are communicated to selector 55. Selector 55 has four switches 120, 121, 122 and 123. Each of these switches has four different states, and each switch sequentially enters a different state in the $T_1$ time period. In each state each switch 120, 121, 122 and 123 passes a digital sample $S_A$, $S_B$, $S_C$ and $S_D$ according to Table A:

TABLE A

| Switch | Time $T_1$ | $2T_1$ | $3T_1$ | $4T_1$ | $5T_1$... |
|---|---|---|---|---|---|
| **120** | $S_B(T_1)$ | $S_C(2T_1)$ | $S_D(3T_1)$ | $S_A(4T_1)$ | $S_B(5T_1)$... |
| **121** | $S_C(T_1)$ | $S_D(2T_1)$ | $S_A(3T_1)$ | $S_B(4T_1)$ | $S_C(5T_1)$... |
| **122** | $S_D(T_1)$ | $S_A(2T_1)$ | $S_B(3T_1)$ | $S_C(4T_1)$ | $S_D(5T_1)$... |
| **123** | $S_A(T_1)$ | $S_B(2T_1)$ | $S_C(3T_1)$ | $S_D(4T_1)$ | $S_A(5T_1)$... |

In order to obtain real quadrature sample $4I_A(pT_1)$ at output terminal 90, it is necessary to have available at output terminal 90 the two right-hand terms of equation (25): $S_A(pT_1) - 3S_A(pT_1 - 2T_1)$. For example, at time $t = 4T_1$ the terms $S_A(4T_1) - 3S_A(4T_1 - 2T_1)$ are needed.

To provide $S_A(4T_1)$, the output of switch 120 is connected to a positive input of combiner 80 and the output of combiner 80 is connected to output terminal 90. At time $4T_1$ this connection provides the digital signal $S_A(4T_1)$ to output terminal 90.

To provide the signal $-3S_a(4T_1 - 2T_1)$, the output of switch 122 is connected to multiplier 61. At time $t = 4T_1 - 2T_1$ digital signal $S_A(2T_1)$ is communicated to multiplier 61 where the amplitude of the signal is increased by three times. The output of multiplier 61 is connected to delay register 70 where the signal $3S_A(2T_1)$ is delayed two time periods $T_1$ to provide the signal $3S_A(4T_1 - 2T_1)$ at time $4T_1$. The output of delay register 70 is connected to a negative input of combiner 80, where at time $4T_1$ the resultant signal from combiner 80 to output terminal 90 is $S_A(4T_1) - 3S_A(4T_1 - 2T_1)$; the real quadrature sample $4I_A(4T_1)$.

In order to obtain imaginary quadrature sample $4Q_A(pT_1)$ at output terminal 91 it is necessary to have available at output terminal 91 the two right-hand terms of equation (26): $3S_A(pT_1 - T_1) - S_A(pT_1 - 3T_1)$. For example, at time $t = 4T_1$ the terms $3S_A(4T_1 - T_1) - S_A(4T_1 - 3T_1)$ are needed.

To provide $3S_A(4T_1 - T_1)$, the output of switch 121 is connected to multiplier 60. At time $t = 4T_1 - T_1$ digital signal $S_A(3T_1)$ is communicated to multiplier 60 where the amplitude of the signal is increased by three times. The output of multiplier 60 is connected to a positive input of combiner 81. The output of combiner 81 is connected to delay register 72 where the signal $3S_A(3T_1)$ is delayed one time period $T_1$ to provide the signal $3S_A(4T_1 - T_1)$ at time $4T_2$. The output of delay register 72 is connected to output terminal 91.

To provide $-S_A(4T_1 - 3T_1)$, the output of switch 123 is connected to delay register 71. At time $t = 4T_1 - 3T_1$ digital signal $S_A(T_1)$ is communicated to delay register 71 where the signal is delayed two time periods $T_1$ to provide the signal $S_A(3T_1 - 2T_1)$ at time $3T_1$. The output of delay register 71 is connected to a negative input of combiner 81.

The signal $-S_A(3T_1 - 2T_1)$ from combiner 81 is delayed one time period $T_1$ in delay register 72 to provide a signal $-S_A(4T_1 - 3T_1)$ at time $4T_1$. The resultant signal, therefore, from delay register 72 at time $4T_1$ to output terminal 91 is $3S_A(3T_1 - T_1) - S_A(4T_1 - 3T_1)$; the imaginary quadrature sample $4Q_A(4T_1)$.

Figure 5:
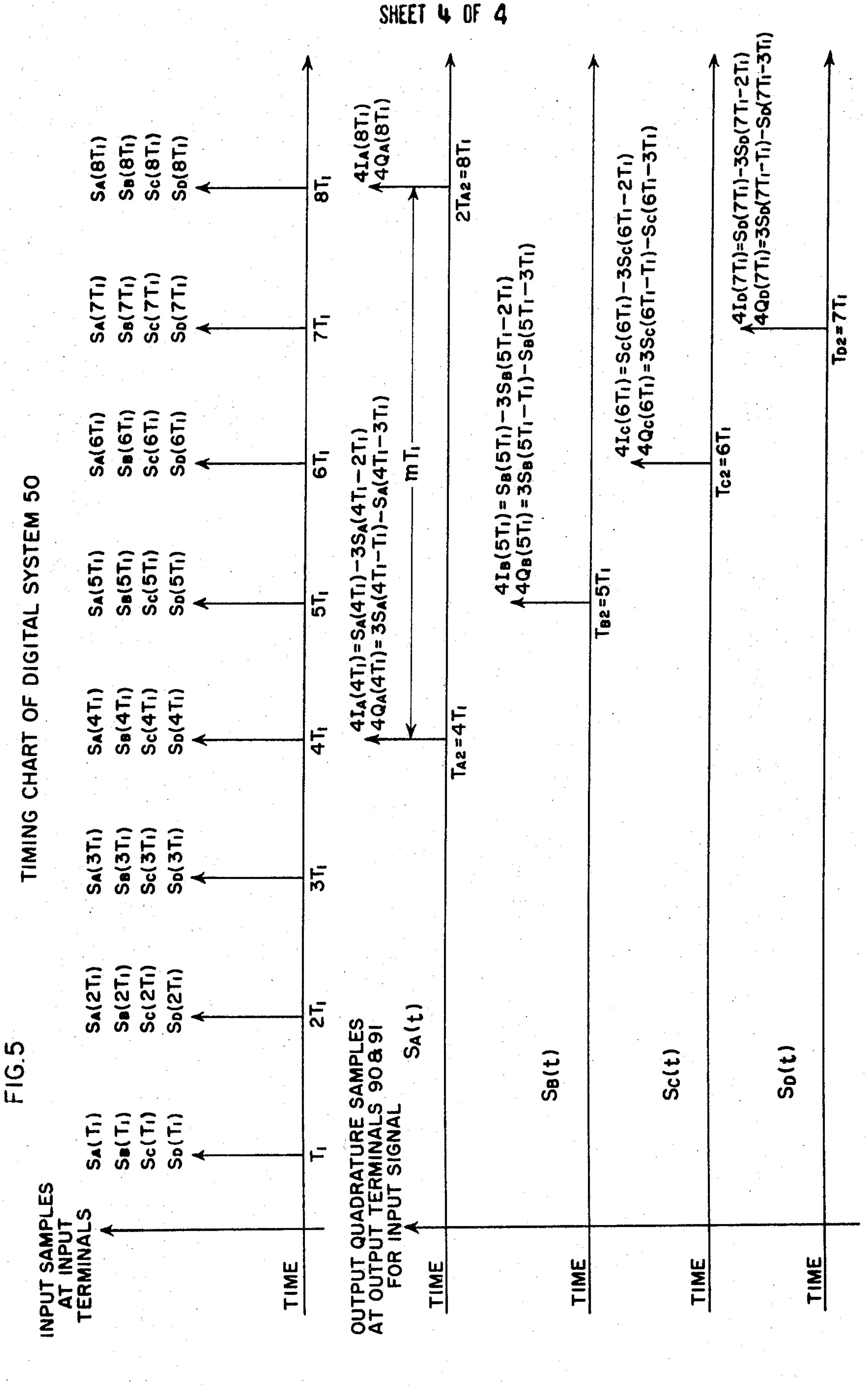
FIG. 5 is a timing chart of the embodiment shown in FIG. 4.

The above process is continued for subsequent time periods $pT_2$ to generate quadrature samples $I_B$, $I_C$, $I_D$ at output terminal 90 and $Q_B$, $Q_C$ and $Q_D$ at output terminal 91 as is clearly shown by the timing chart in FIG. 5. Therefore, for the embodiment shown, during a time period of $4T_1$ or $T_2$, paired quadrature samples are generated for four input signals. The process may be repeated for as long as desired, to generate additional quadrature samples. It is, of course, understood that for different values of $m$ and $n$ or for a different number of input signals a different embodiment could be arranged according to the above teachings to satisfy the requirements of equation (16) and thereby generate the desired quadrature samples.

What is claimed as new and desired to be secured by Letters Patent of the United States is:

1. A method of generating digitized quadrature samples approximating the sampled complex envelope of an input signal S(t) relative to a carrier frequency $f_c$, including the steps of:

a. sampling said input signal at time designated $t = 0$ to obtain a sample S(0);

b. converting said sample into a digital sample and storing such digital sample;

c. repeating steps (*a*) and (*b*) for a selected number, $n$, of times occurring at regular intervals $T_1 = 1/(4f_c)$ so as to store a set of $n + 1$ digital samples designated S(0), $S(T_1)$, $S(2T_1)$ . . . $S(nT_1)$;

d. repeatedly performing the previous steps with starting times differing by a time interval $T_2 = mT_1$, where $m$ is a selected integer, so as to generate successive sets of $n + 1$ digital samples the samples within which sets are at uniform intervals $T_1$ for any selected value of $m$, the $k$'th such successive set of digital samples being designated $S(kT_2)$, $S(kT_2 + T_1)$, $S(kT_2 + 2T_1)$ . . . $S(kT_2 + nT_1)$, and each time replacing the stored previous set with the succeeding set whereby k takes on successive integer values; and e. generating during each time interval $T_2$ a pair of quadrature samples designated $I(kT)$ and $Q(kT)$ by digitally processing the stored samples according to the relations:

$$I(kT_2) = \text{real part of } R(kT_2),$$

$$Q(kT_2) = \text{imaginary part of the } R(kT_2),$$

where:

$$R(kT_2) = (-j)^{mk} 2^{1-n} \sum_{p=0,1,2\ldots}^{n} A_n(p)\,(j)^p S(kT_2 - pT_1)\; A_n(p) = n!/(n-p)!(p)!$$

2. A method of generating quadrature samples as defined in claim 1, wherein the value of m is set equal to 4 whereby the value of $R(kT_2)$ reduces to:

$R(kT_2) = (-j)^{mk} \{ [1/4S(kT_1) - 3/4S(kT_1 - 2T_2)] + j[3/4S(kT_1 - T_2) - 1/4S(kT_1 - 3T_2)] \}$

3. A method of generating digitized quadrature samples approximating the sampled complex envelope of an input signal relative to a carrier frequency $f_c$, including the steps of:

a. sampling said real input signal $S(t)$ at a time $T_1$, where $T_1$ equals $1/(4f_c)$, to obtain input signal samples;
b. converting said input signal samples to digital samples;
c. delaying said digital samples one time period $T_1$, and multiplying said digital samples by three to provide a first signal;
d. delaying said digital samples three time periods $T_1$ to provide a second signal;
e. subtracting said second signal from said first signal to provide a third signal;
f. delaying said digital samples two time periods $T_1$ and multiplying said digital samples by three to provide a fourth signal;
g. subtracting said fourth signal from said digital samples to provide a fifth signal;
h. communicating said third signal to a first output terminal; and
i. communicating said fifth signal to a second output terminal.

4. A method of generating quadrature samples as defined in claim 3 including the additional steps of:

a. sampling said third signal applied to said first output terminal, at time periods $T_2$, where $T_2 = mT_1$ and $m$ is an integer; and
b. sampling said fifth signal applied to said second output terminal at said time periods $T_2$.

5. An apparatus for generating digitized quadrature samples approximating the sampled complex envelope of an input waveform S(t) relative to a carrier frequency $f_c$, comprising:

a. means for receiving said input signal S(t);
b. signal sampler means for sampling said input signal S(t) at a periodic interval of $T_1$, where $T_1$ equals $1/(4f_c)$, to obtain input signal samples;
c. analog-to-digital conversion means for converting said input signal samples to digital samples;
d. means for delaying said digital samples one time period $T_1$ and for multiplying said digital samples by a factor of three to provide a first signal;
e. means for delaying said digital samples three time periods $T_1$ to provide a second signal;
f. means for subtracting said second signal from said first signal to provide a third signal;
g. means for delaying said digital samples two time periods $T_1$ and for multiplying said digital samples by a factor of three to provide a fourth signal;
h. mean for subtracting said fourth signal from said digital samples to provide a fifth signal;
i. first and second output terminals;
j. means for communicating said third signal to said first output terminal; and
k. means for communicating said fifth signal to said second output terminal.

6. Apparatus as defined in claim 5 further including first and second samplers; said samplers being respectively connected to said first and second output terminals and operative to sample their outputs at time periods $T_2$ where $T_2 = mT_1$ and $m$ is an integer.

7. Apparatus for generating digitized quadrature samples approximating the sampled complex envelopes of each of a plurality of input signals relative to a carrier frequency $f_c$, comprising:

a. means for receiving a plurality of input signals;
b. signal sampler means for sampling each of said input signals at a periodic interval of $T_1$, where $T_1$ equals $1/(4f_c)$, to obtain input signal samples of each of said input signals;
c. analog-to-digital conversion means for converting said input signal samples to digital samples; and
d. a digital system for processing said digital samples comprising:
   i. switching means having inputs to receive said digital samples and further having first, second, third and fourth terminals, said switching means operating to selectively communicate said digital samples to said terminals;
   ii. first and second outputs;
   iii. a first signal processor channel comprising a first combiner having a positive input connecting to said first terminal and further having a negative input, a first multiplier and first delay register connected in series between said second terminal and said negative input of said first combiner; and means for connecting said combiner to said first output; and
   iv. a second signal processor channel comprising a second combiner having a positive input and a negative input; a second multiplier connected between said third terminal and said positive input of said second combiner; a second delay register connected between said fourth terminal and said negative input of said second combiner and said second output.

* * * * *